US011188916B2

(12) United States Patent
Abifaker et al.

(10) Patent No.: US 11,188,916 B2
(45) Date of Patent: Nov. 30, 2021

(54) MITIGATION OF FRAUDULENT TRANSACTIONS CONDUCTED OVER A NETWORK

(71) Applicant: FIRST DATA RESOURCES, LLC, Omaha, NE (US)

(72) Inventors: Basil Munir Abifaker, San Diego, CA (US); Stephen Jones, Escondido, CA (US)

(73) Assignee: First Data Resources, LLC, Omaha, NE (US)

( * ) Notice: Subject to any disclaimer, the term of this patent is extended or adjusted under 35 U.S.C. 154(b) by 824 days.

(21) Appl. No.: 14/228,977

(22) Filed: Mar. 28, 2014

(65) Prior Publication Data

US 2015/0278817 A1 Oct. 1, 2015

(51) Int. Cl.
*G06Q 20/40* (2012.01)
(52) U.S. Cl.
CPC ................. *G06Q 20/4016* (2013.01)
(58) Field of Classification Search
CPC ...... G06Q 40/00; G06Q 20/40; G06Q 40/025; G06Q 20/4016
USPC ...................................... 705/35, 44
See application file for complete search history.

(56) References Cited

U.S. PATENT DOCUMENTS

| 7,136,841 B2* | 11/2006 | Cook ................. G06Q 20/027 705/75 |
| 7,251,624 B1* | 7/2007 | Lee ................. G06Q 30/06 705/26.1 |
| 7,711,620 B2 | 5/2010 | Abifaker |
| 7,953,654 B2 | 5/2011 | Abifaker |
| 8,396,772 B2 | 3/2013 | Abifaker |
| 8,521,629 B2 | 8/2013 | Abifaker |
| 8,554,655 B2 | 10/2013 | Abifaker |
| 8,655,762 B2 | 2/2014 | Abifaker |
| 2007/0174164 A1 | 7/2007 | Biffle et al. |
| 2008/0021801 A1* | 1/2008 | Song ................. G06Q 10/0635 705/35 |
| 2012/0179591 A1 | 7/2012 | Monk |

(Continued)

OTHER PUBLICATIONS

Automated detection of deceptive behavior in social media. Song, Zhang, et al. Pacific Asia Conference on Information Systems. p. 1-15. (Year: 2012).*

(Continued)

*Primary Examiner* — Kelly S. Campen
*Assistant Examiner* — John O Preston
(74) *Attorney, Agent, or Firm* — Foley & Lardner LLP

(57) ABSTRACT

The subject matter disclosed herein provides methods for detecting and mitigating fraudulent transactions conducted over a network. This method can access one or more data values associated with an online transaction between a first party and a second party. The first party can initiate the online transaction. The data values can characterize an identity of the first party and the second party. A score representing a likelihood that the online transaction is fraudulent can be generated. The generation of the score can be based on one or more models for detecting fraud using the data values. The score can be compared to one or more threshold scores. The online transaction can be authorized or rejected based on the comparing. Related apparatus, systems, techniques, and articles are also described.

21 Claims, 4 Drawing Sheets

(56) References Cited

U.S. PATENT DOCUMENTS

| | | | |
|---|---|---|---|
| 2012/0226579 A1* | 9/2012 | Ha | G06Q 30/02 705/26.35 |
| 2012/0246019 A1* | 9/2012 | Wolfe | G06Q 20/28 705/26.1 |
| 2014/0058914 A1* | 2/2014 | Song | G06Q 20/4016 705/35 |
| 2014/0067656 A1* | 3/2014 | Cohen Ganor | G06Q 20/384 705/39 |
| 2014/0279518 A1* | 9/2014 | Acuna-Rohter | G06Q 20/40 705/44 |

OTHER PUBLICATIONS

Consumer transactions on the web. Gulnar Ali and Kin Fun Li. 2014 28th International Conference on Advanced Information Networking and Applications Workshops. p. 686-689 (Year: 2014).*

International Search Report and Written Opinion dated Sep. 23, 2016 for International Application No. PCT/US2015/022238, filed Mar. 24, 2015; all pages.

* cited by examiner

US 11,188,916 B2

MITIGATION OF FRAUDULENT TRANSACTIONS CONDUCTED OVER A NETWORK

TECHNICAL FIELD

This disclosure relates generally to the detection and mitigation of fraudulent transactions such as purchase orders conducted over a network.

BACKGROUND

The number of retailers with an online presence has exploded in parallel with the growth of the Internet. As more people become connected to the Internet, the number of online sales has increased, while the number of traditional in-store sales has fallen. This shift in consumer behavior has resulted in a rising incidence rate in fraudulent card not present (CNP) transactions. A CNP transaction is a payment card transaction that is made when the cardholder is not physically present with the card at the time of payment. Because the merchant is not able to physically inspect the card, traditional fraud detection techniques requiring physical manipulation of the card are unhelpful.

SUMMARY

In some implementations, methods and apparatus, including computer program products, are provided for the detection and mitigation of fraudulent transactions conducted over a network.

In one aspect, one or more data values associated with an online transaction between a first party and a second party are accessed. The online transaction is initiated by the first party. The one or more data values characterize an identity of the first party and an identity of the second party. A score representing a likelihood that the online transaction is fraudulent is generated. The generation of the score is based on one or more models for detecting fraud using the one or more data values. The score is compared to one or more threshold scores. The online transaction is authorized or rejected based on the comparing.

The above methods, apparatus, and computer program products can, in some implementations, further include one or more of the following features.

The one or more data values can further characterize a message associated with the online transaction. The one or more models for detecting fraud can examine the message associated with the online transaction.

The examination of the message can include searching one or more sources for one or more records associated with the first party and the second party. The one or more records can maintain personal information regarding the first party and the second party. The examination of the message can also include comparing the one or more data values characterizing the message with the personal information in the one or more records. The personal information can include a relationship between the first party and the second party. The one or more sources can include one or more social media platforms and databases.

One or more data values can be compared to a blacklist of one or more negative data values when the one or more data values become available. The generation of the score can follow the comparing only if none of the one or more data values matches the one or more negative data values.

The one or more data values characterizing an identity of the first party can include an e-mail address of the first party.

The one or more models for detecting fraud can determine whether a domain name of the e-mail address of the first party is associated with a free e-mail service.

The one or more data values can further characterize a payment mechanism for the online transaction including one or more of a credit card number, a card verification value, and a bank identification number.

The one or more data values characterizing an identity of the first party can include an IP address associated with the first party. The one or more models for detecting fraud can at least determine whether the IP address associated with the first party is a forged IP address. The one or more models can also determine whether a plurality of online transactions are being sent from the IP address of the first party using different payment mechanisms.

The one or more models for detecting fraud can determine a velocity of activity associated with the payment mechanism.

The score can be generated before the data values characterizing the payment mechanism are accessed.

The one or more models for detecting fraud can determine an amount of time that is spent by the first party while placing the online transaction.

An audit interface can be provided for manual review of the online transaction when the score falls within a predetermined range.

The online transaction can be an order for one or more gift cards. The first party can be a buyer that places the order for the one or more gift cards, and the second party can be a recipient of the order for the one or more gift cards. The one or more gift cards can be electronic gift cards or physical gift cards.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

Like reference symbols in the various drawings indicate like elements.

DETAILED DESCRIPTION

This application discloses techniques for determining the likelihood that an online transaction for the purchase of a good or service (e.g., a purchase order for a gift card) is fraudulent or likely to be fraudulent. In some implementations, various analyses can be conducted on data values associated with the transaction in order to determine an overall risk score. If the overall risk score exceeds a threshold score, then the transaction can be stopped. In some implementations, the transaction can be flagged for manual review.

Figure 1:
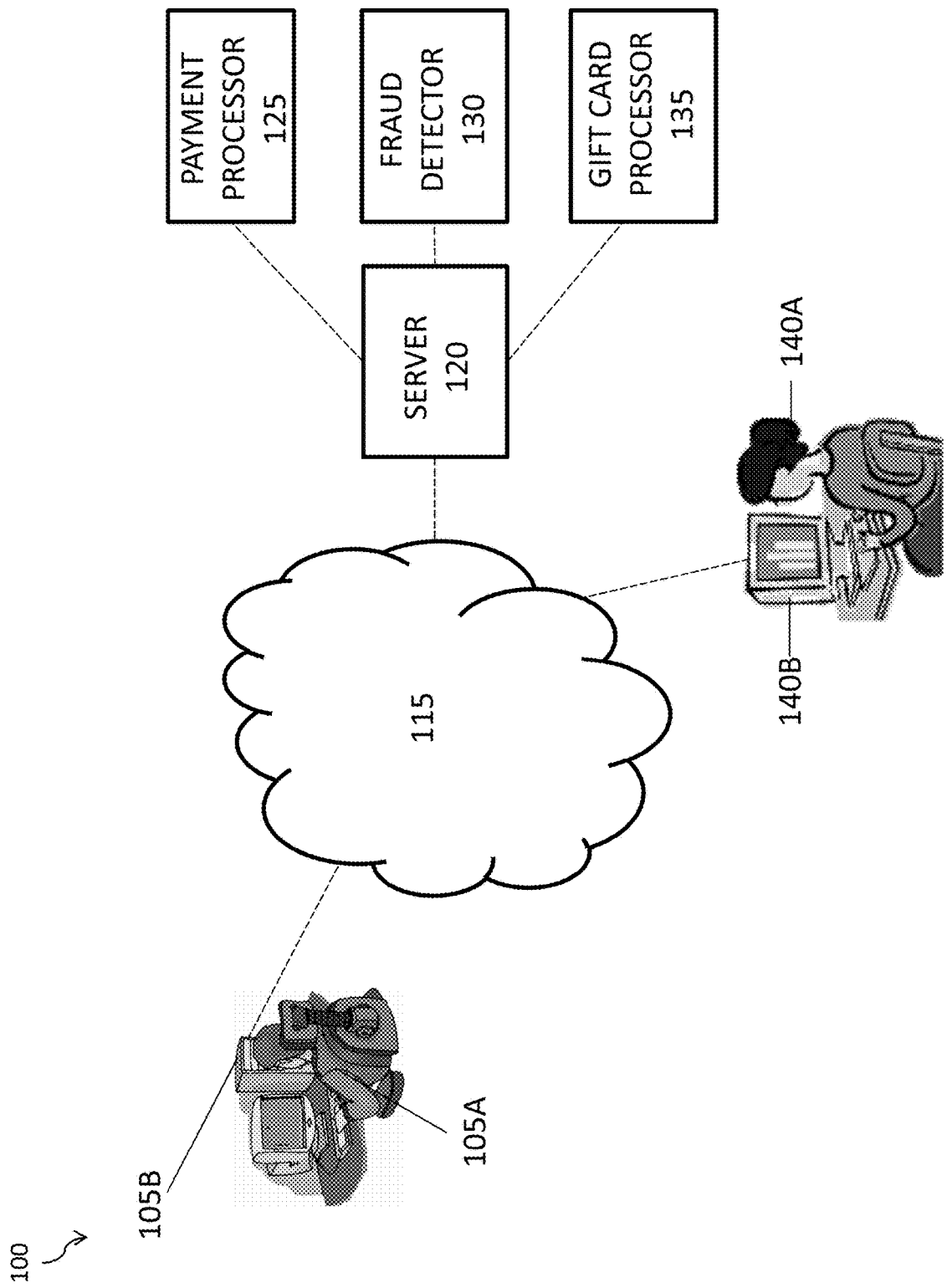
FIG. 1 illustrates a system for using various fraud detection mechanisms.

FIG. 1 illustrates an exemplary system 100 for using the fraud detection mechanisms disclosed herein. A first party, such as a buyer 105A, can use computing device 105B to conduct an online transaction over network 115. In some implementations, this online transaction can be a purchase of services or goods over the Internet. For example, buyer 105A can use computing device 105B to place a gift card order for an electronic or physical gift card for a second party, such as recipient 140A. Once buyer 105A enters payment information for the purchase order, computing device 105B can transmit the purchase order to server 120 via network 115. Server 120 can access various data values associated with the purchase order and can transmit these data values to payment processor 125 and fraud detector 130 to determine the likelihood that the purchase order is fraudulent as described below. Server 120 can also access various data values associated with buyer 105A as soon as computing device 105B communicates with the server. If payment processor 125 and/or fraud detector 130 determine that the purchase order is fraudulent based on these data values, then the purchase order can be denied. If, however, payment processor 125 and fraud detector 130 determine that the purchase order is legitimate, then server 120 can inform gift card processor 135 to authorize the purchase order and activate the gift card. If, for example, buyer 105A purchases an electronic gift card for recipient 140A, the recipient can redeem the electronic gift card using computing device 140B. While system 100 includes a gift card processor 135, this component may be absent if, for example, a transaction is being conducted for a service or other type of good. In these implementations, server 120 can, for example, inform buyer 105A and/or recipient 140A that the transaction was authorized.

In the implementation of FIG. 1, payment processor 125, fraud detector 130, and gift card processor 135 are illustrated as separate devices or components. In some implementations, these devices can be consolidated into a single device or two separate devices. In some implementations, the functions performed by these devices can be performed by server 120. Although computing devices 105B and 140B are illustrated as desktop computers, other types of computing devices can be used including, for example, a laptop computer, a tablet computer, a smart phone, and the like. The system of FIG. 1 can include additional components that, in combination with one or more of server 120, payment processor 125, fraud detector 130, and gift card processor 135 can perform the functionality disclosed in U.S. Pat. No. 7,711,620 (entitled "Gift Card Services For Mobile Devices"), U.S. Pat. No. 8,521,629 (entitled "Gift Card Services For Mobile Devices"), U.S. Pat. No. 7,953,654 (entitled "Integration Of Gift Card Services For Mobile Devices And Social Networking Services"), U.S. Pat. No. 8,396,772 (entitled "Integration Of Gift Card Services For Mobile Devices And Social Networking Services"), U.S. Pat. No. 8,554,655 (entitled "Integration Of Gift Card Services For Mobile Devices And Social Networking Services"), and U.S. Pat. No. 8,655,762 (entitled "Integration Of Gift Card Services For Mobile Devices And Social Networking Services"). The contents of the patents identified above are herein incorporated by reference in their entirety for all purposes.

Figure 2:
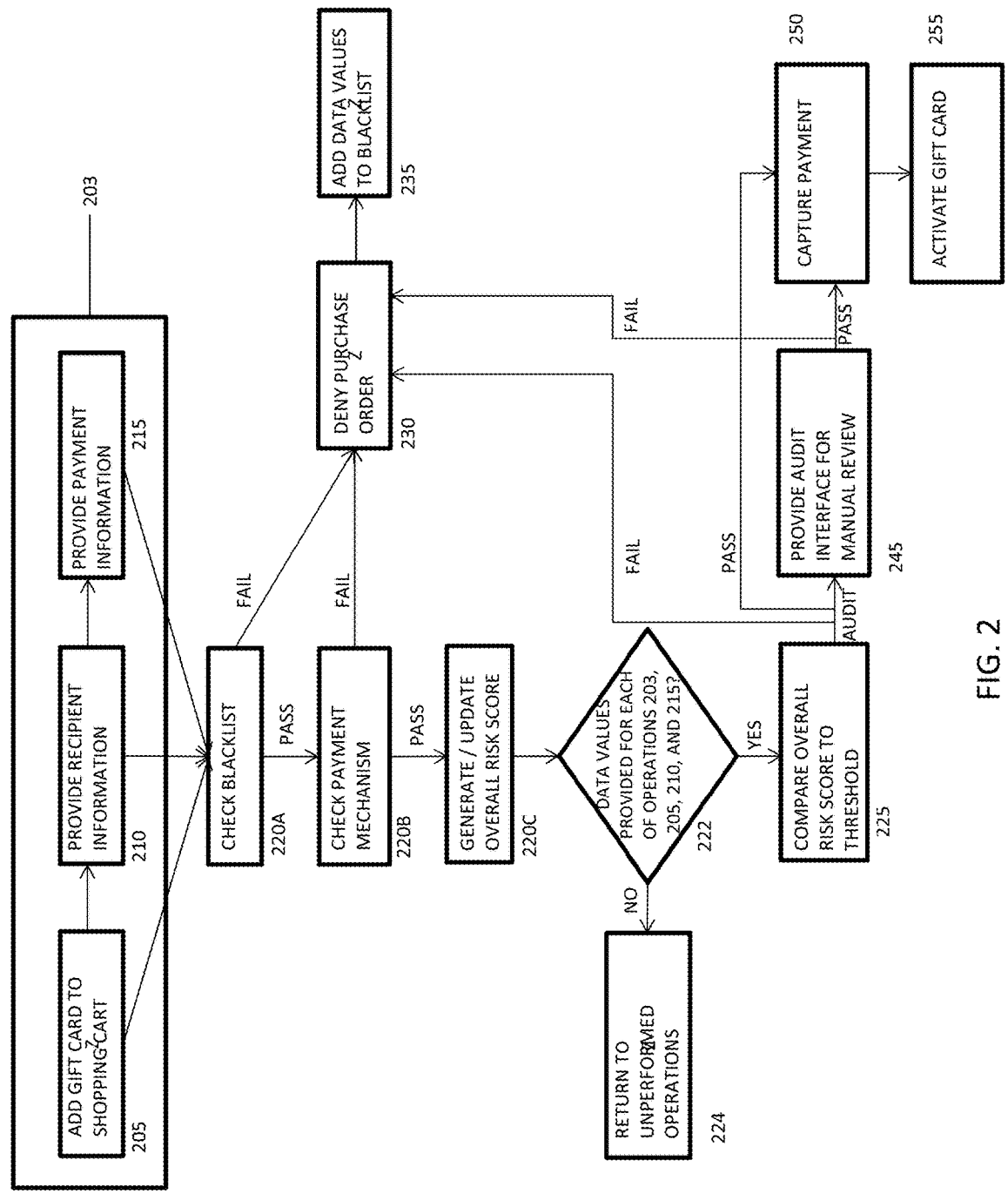
FIG. 2 illustrates a flowchart for processing a gift card order.

FIG. 2 illustrates a flowchart 200 for processing an online transaction. Although this online transaction is primarily described with reference to the purchase of a gift card, the operations disclosed herein can be used with the purchase of any good or service. The operations illustrated in flowchart 200 can be performed by the entities described above with respect FIG. 1.

Conventional fraud detection methods assess the likelihood that a purchase order is fraudulent only after a buyer enters payment information. These determinations are generally based on information associated with the means of payment such as a credit card number, a billing address, and the like. The processes of flowchart 200 provide a more holistic approach by looking at a variety of factors including, for example, personalized information regarding the buyer and the recipient, merchant characteristics, and the like. These factors are described in further detail below. Moreover, unlike conventional methods that assess fraudulent behavior only when payment information is submitted at checkout, the processes of flowchart 200 can be utilized anytime during the purchase process.

The purchase process can include operations 203, 205, 210, and 215. Server 120 can perform operation 203 to collect background information regarding buyer 105A and his/her computing device 105B. A first party, such as buyer 105A, can perform operations 205, 210, and 215 using an application running on computing device 105B. Buyer 105A can use this application to place a gift card purchase order for a second party, such as recipient 140A. In some implementations, the application can be hosted by server 120, and computing device 105B can remotely access the application via network 115. During these operations, the application can prompt buyer 105A for various data values needed to process the purchase order. One or more of server 120, payment processor 125, and fraud detector 130 can use the data values provided by buyer 105A to determine the likelihood that the purchase order is fraudulent as soon as the data is received. Rather than postpone this determination until checkout like conventional fraud detection methods, this determination can be made as soon as the data values associated with any of operations 203, 205, 210, and 215 become available. While operations 205, 210, and 215 are illustrated as being performed in sequential order, the order in which these operations are performed can be adjusted.

Operation 203 can run in parallel with any of operations 205, 210, and 215. During operation 203, server 120 can collect background information regarding computing device 105B as soon as the computing device connects to the server. Since computing device 105B is assumed to be under the control of buyer 105A, the data values collected during operation 203 can be associated with the buyer's identity. These data values can include, for example, the IP address of computing device 105B, the type of computing device being used (e.g., desktop, laptop computer, table computer, smart phone, etc.), the browser being used on the computing device, the operating system running on the computing device, the geographic location of the computing device, and the like. Server 120 can collect these data values regardless of whether the buyer has entered any information during operations 205, 210, and 215. Server 120 can distribute these data values to payment processor 125 and fraud detector 130 for analysis.

During operation 205, buyer 105A can add a gift card to his/her electronic shopping cart by selecting a gift card and assigning a redemption value to the gift card. For example, in celebration of Valentine's Day, buyer 105A can select a gift card having Valentine's Day related art (e.g., an image of a heart with a "Happy Valentine's Day" banner) and assign a $200 redemption value to the gift card. As buyer 105A makes his/her selections, the data values associated with these selections can be sent to server 120 which, in turn, can distribute the data values to payment processor 125 and fraud detector 130 for analysis. Referring to the above example, these data values can indicate that buyer 105A has selected Valentine's Day card art and has assigned a $200 redemption value to the purchase order.

During operation 210, the application can prompt buyer 105A to provide data values associated with recipient 140A. These data values can include, for example, the recipient's 140A name, e-mail address (for delivery of an electronic gift card), mailing address (for delivery of a physical gift card), phone number, and the like. During operation 210, buyer 105A can leave a personalized greeting or message for recipient 140A. Continuing with the above example, this personalized message can include the text "To Ann, my wife." Data values representing the contents of this personalized message (e.g., that Ann is the buyer's 105A wife) can be sent to server 120 which, in turn, can distribute the data values to payment processor 125 and fraud detector 130 for analysis.

During operation 215, the application can prompt buyer 105A to provide payment information. Payment information can include data values representative of the payor's identity (i.e., data values that identify buyer 105A) as well as data values associated with the means of payment (i.e., data values regarding the payment mechanism). Data values identifying buyer 105A can include, for example, the buyer's name, phone number, street address, e-mail address, and the like. Data values associated with the payment mechanism can include, for example, a credit card number and card verification value (CVV), a credit card expiration date, a billing address, and the like. Although the implementations disclosed herein are primarily described with reference to a credit card, any type of payment can be used including, for example, a debit card, an electronic check, an online money transfer, and the like. These data values can be sent to server 120 which, in turn, can distribute these data values to payment processor 125 and fraud detector 130 for analysis.

As illustrated in flowchart 200, the data values collected during operations 203, 205, 210, and 215 can be analyzed at operations 220A, 220B, and 220C to determine the likelihood that the online transaction (i.e., the purchase order) is fraudulent. While operations 220A, 220B, and 220C are illustrated as being performed in sequential order, the order of these operations can be adjusted. In the implementation of FIG. 2, operation 220A can be performed as soon as data values associated with any of operations 203, 205, 210, and 215 become available (i.e., received by server 120, payment processor 125, or fraud detector 130). For example, as soon as fraud detector 130 receives data values associated with operation 203 from server 120, the fraud detector can begin performing operation 220A even if buyer 105A has not provided any data values for operations 205, 210, or 215. Likewise, as soon as fraud detector 130 receives data values associated with operation 205, for example, the fraud detector can begin performing operation 220A. As such, the processes of flowchart 200 can determine whether a purchase order is fraudulent even before payment information is submitted at operation 215. During operations 220A, 220B, and 220C, one or more of payment processor 125 and fraud detector 130 can perform various analyses on the data values by checking the data values against a blacklist (operation 220A), checking the data values of the payment mechanism (operation 220B), and generating or updating an overall risk score (operation 220C). Each type of analysis is described below.

Blacklist Check

During operation 220A, fraud detector 130 can compare the data values received from server 120 to a blacklist of negative data values. These negative data values can be associated with known fraudulent elements and can be compiled from a negative historical file of prior fraud attempts, problem customers, charge back records, customers receiving funds, merchant comments, and the like. The negative historical file can include records from one merchant (i.e., a merchant specific file) or multiple merchants (i.e., a shared file). The negative data values on the blacklist can include, for example, names, credit card numbers, e-mail addresses, billing addresses, shipping addresses, phone numbers, and the like. In some implementations, the negative data values can also include IP addresses associated with computing devices that have been used to commit fraudulent transactions.

If fraud detector 130 determines that any of the available data values matches any of the negative data values in the blacklist, then there may be a great likelihood that the gift card order is fraudulent. For example, the blacklist can include a list of lost or stolen credit card numbers. When buyer 105A initiates a gift card order, fraud detector 130 can check whether the buyer's credit card number matches any of the credit card numbers on the blacklist. If a match is found, fraud detector 130 can deny the gift card order at operation 230 and inform buyer 105A of the same. At operation 235, fraud detector 130 can add the data values for this gift card order to the blacklist.

If, however, fraud detector 130 determines that none of the available data values matches any of the negative data values in the blacklist (i.e., pass the blacklist check), then processing can proceed to operation 220B.

Payment Mechanism Check

During operation 220B, payment processor 125 can examine the data values associated with the payment mechanism and perform various checks using these data values.

For example, payment processor 125 can verify the billing address associated with the credit card. During this verification process, payment processor 125 can compare the cardholder's billing address and zip code to address information stored at the card issuing bank. A mismatch between the billing address or zip code can be indicative of a fraudulent gift card order.

Alternatively or additionally, payment processor 125 can perform a bank identification number (BIN) check. The first six digits of a credit card can represent an identification number of a bank issuing the credit card. During a bin check, payment processor 125 can use this number to identify the issuing bank and to look up the issuing bank's address. Payment processor 125 can use this information to determine whether buyer 105A and the issuing bank are located in the same country. A mismatch (i.e., issuing bank and buyer 105A are not in the same country) can be indicative of a fraudulent gift card order.

Payment processor 125 can also check the credit card's card verification value (CVV) to determine whether the gift card order is fraudulent. The CVV is a security code of three or four digits that can be printed on a credit card but may not be embedded or encrypted in the magnetic strip. Since most fraudulent transactions result from stolen credit card numbers rather than the theft of physical cards, a buyer 105A that can supply the correct CVV is more likely to be in possession of the credit card and, consequently, the gift card order is more likely to be legitimate. However, if buyer 105A supplies an incorrect code, then payment processor 125 can determine that the gift card order is fraudulent.

Payment processor 125 can perform one or more of the above-identified checks in any combination and in any sequence. If any of these checks indicates that the gift card order is fraudulent, then payment processor 125 can deny the gift card order at operation 230 and inform buyer 105A of the same. In some implementations, payment processor 125 can also add the data values associated with the payment mechanism to the blacklist at operation 235 in order to prevent a repeat transaction using the same payment card. In some implementations, payment processor 125 can require two or more checks to fail before denying the gift card order. The number and combination of checks needed to deny the gift card order can be set by an administrator.

If, however, payment processor 125 determines that a sufficient number of checks have passed, then processing can proceed to operation 220C.

Risk Score

During operation 220C, fraud detector 130 can analyze the data values received from server 120 to generate an overall risk score using one or more fraud detection models. The overall risk score can represent a likelihood that a buyer's gift card order is fraudulent and can be determined in accordance with Equation 1.

$$\text{Overall Risk Score} = W_1 M_1 + W_2 M_2 + \ldots + W_n M_n \quad \text{(Equation 1)}$$

With regard to Equation 1, $W_n$ can represent the weight assigned to a particular model $M_n$, and the product $W_n M_n$ can represent a particular model's score contribution to the overall risk score. The overall risk score can be the sum of each model's score contribution. Assigning weights can emphasize or de-emphasize the relative importance of one model's score contribution over another. A gift card order having a high overall risk score is more likely to be a fraudulent transaction than a gift card order having a low overall risk score. The following paragraphs describe the different fraud detection models that can be used by fraud detector 130 during operation 220C.

In an exemplary fraud detection model, fraud detector 130 can consider whether any of the data values received from server 120 are present in a positive database file. The positive database file can maintain records of customers who have successfully made purchases in the past without being flagged for fraud. This list can have similar information as the negative database file including, for example, a customer's name, credit card number, e-mail address, billing address, shipping address, phone number, the IP addresses associated with the customer's computing device, and the like. If there is a match between any of the received data values and the data records in the positive database file, then fraud detector 130 can assign a low score contribution for this model to indicate that this gift card order may not be fraudulent. In some implementations, fraud detector 130 can adjust this model's score contribution depending on the number of matching data values.

Another model for detecting fraud can examine personalized information in the gift card order. Personalized information can be key words, key phrases, or images indicative of one or more personal attributes associated with buyer 105A and/or recipient 140A. Personalized information can be included in a personalized greeting or message as described above with respect to operation 210. Personal attributes can be indicative of personal relationships (e.g., spouse, child, parent, employer, employee, etc.), special dates or occasions (e.g., an anniversary, birthday, graduation date, etc.), personal activities or milestones (e.g., birth of a new child, job promotion, housewarming party, upcoming move, etc.), and the like. For example, if buyer 105A is buying a gift card for his mother's birthday, the message can be addressed "To Mom" and can include a graphic or text stating "Happy Birthday." The contents of this message can be represented by the data values associated with operations 205 and 210. Upon receiving these data values, fraud detector 130 can deduce a child-parent relationship between buyer 105A and recipient 140A and a special occasion (i.e., mom's birthday) based on the key words in the message. Fraud detector 130 can also deduce the occurrence of a birthday if the message also includes card art (e.g., a picture of a birthday cake). In another example, if buyer 105A is buying a gift card as a housewarming present for an employee's new home, the message can state "Thanks for being a great employee! Can't wait to see your new home." Upon receiving the data values associated with this message, fraud detector 130 can deduce an employer-employee relationship between buyer 105A and recipient 140A and a personal milestone (i.e., a home purchase) based on the key words in this message.

Fraud detector 130 can be configured to recognize key words and key phrases generally associated with personalized information. An administrator can compile a list of key words and key phrases and save them to a file that can be accessed by fraud detector 130. Upon detecting a key word or key phrase in the gift card order, fraud detector 130 can search one or more sources connected to network 115 to verify the accuracy of the personalized information. These sources can provide personal information regarding buyer 105A and/or recipient 140A and can be publicly (e.g., online social media platforms, blogs, etc.) or privately maintained (e.g., employee directories, customer databases, etc.). If fraud detector 130 is able to verify the accuracy of the personalized information, then the gift card order is likely a legitimate transaction. For example, if a gift card order includes key words or key phrases indicative of an employer-employee relationship, then fraud detector 130 can access public and private databases and social networks to determine whether the buyer and recipient work at the same company and whether the employer-employee relationship actually exists. If fraud detector 130 is unable to verify the accuracy of the personalized information, then the gift card order may be fraudulent.

Referring to the birthday example described above, fraud detector 130 can search the buyer's gift card order for personalized information during operation 220C and flag the key words "Mom" and "Happy Birthday" and any associated card art. Upon recognizing these key words and images, fraud detector 130 can search, for example, the buyer's and/or recipient's Facebook® pages, Linkedin® pages, and/or personal websites to verify the accuracy of the personalized information. If the personal message in the gift card order also includes a photo of the buyer 105A or recipient 140A, fraud detector 130 can use facial recognition technology to validate the image online. Fraud detector 130 can assign a score contribution for this model based on the search results.

The value of this model's score contribution can depend on the number of personal attributes that can be confirmed. For example, confirmation of all personal attributes (i.e., that recipient 140A is the buyer's mother, that the recipient's birthday is upcoming, and that a photo of buyer and/or recipient can be validated using another source) can yield a lower score contribution than confirmation of a single attribute. Low score contributions can be indicative of a legitimate transaction. Likewise, if fraud detector 130 cannot confirm any of these attributes, then a high score contribution can be assigned to this model to indicate that the transaction may be fraudulent. This latter scenario can also arise if insufficient information is found during the search. In order to account for this possibility, fraud detector 130 can assign a low weight to this model in order to de-emphasize its score contribution to the overall risk score.

Fraud detector 130 can also consider the format of the buyer's and/or the recipient's e-mail address when determining the overall risk score. As mentioned above with respect to operations 210 and 215, buyer 105A can provide either the recipient's e-mail address or the buyer's e-mail address. Fraud detector 130 can consider the string of characters constituting the e-mail address as well as the e-mail address' domain name when determining whether the gift card order is fraudulent.

With regard to the string of characters, an e-mail address containing a buyer's or a recipient's name is more likely to be legitimate (i.e., low score contribution) than an e-mail address having a random assortment of numbers and letters (i.e., high score contribution). In some implementations, fraud detector 130 can search public or private sources for the e-mail address in question to determine whether it is regularly used. E-mail addresses that are frequently used or referred to are more likely to be legitimate than e-mail addresses that are seldom cited.

With regard to domain names, fraud detector 130 can examine whether the e-mail address is associated with a particular organization (such as a school, a company, a government organization, and the like) or with an anonymous or free domain name (e.g., a free e-mail service). A gift card order that is associated with an organization specific e-mail domain name is more likely to be legitimate (i.e., low score contribution) than a gift card order that is associated with a free e-mail domain name (i.e., high score contribution). If fraud detector 130 detects an organization specific domain name, the fraud detector can search public or private sources to confirm whether the holder of the e-mail address actually works at the organization. In some implementations, fraud detector 130 can search public data to determine the age of a particular domain name. This capability can be useful in determining, for example, if an established domain name is being used for legitimate transactions or if the domain name was only recently set up to facilitate fraudulent transactions.

Some fraud detection models can verify any mailing addresses, shipping addresses, and phone numbers provided during operations 205, 210, and 215. During operation 220C, fraud detector 130 can search public and/or private sources, such as post office websites, telephone directories, and the like, to determine whether these data values are actually registered to buyer 105A or recipient 140A. For example, if buyer 105A adds a corporation name, business address, and phone number to his/her gift card order, fraud detector 130 can search an online directory of local businesses to obtain the address and phone number registered to this corporation. If a match is found between some or all of these data values, then fraud detector 130 can assign a low score contribution for this model. However, if no match is found between any of these data values, then fraud detector 130 can assign a high score contribution for this model to indicate that the transaction may be fraudulent.

Fraud detector 130 can check the transaction velocity in yet another fraud detection model. Fraudsters generally spend less time on a retail website when placing a gift card order than legitimate buyers. Accordingly, if a credit card is being used for multiple orders within a short period of time, there is a high likelihood that that these transactions can be fraudulent. Likewise, multiple orders that are placed over a long period of time are likely legitimate. Various rules can be used to recognize fraudulent behavior. For example, fraud detector 130 can be configured to check the number of purchases that are made using the same credit card number within a particular period of time. If the number of purchases exceeds a predetermined threshold, then fraud detector 130 can assign a high score contribution for this model to indicate that these transactions are likely fraudulent. In some situations, however, a buyer 105A may use a different credit card number for each transaction in order to avoid arousing suspicion. In order to account for this behavior, fraud detector 130 can check the IP address of the computing device 105B from which these gift card orders are placed. As explained above, the IP address of computing device 105B can be obtained during operation 203. If a high number of gift card orders are all placed from the same IP address within a particular period of time, then these gift card orders can be fraudulent.

Another model for detecting fraud considers whether the computing device 105B used to initiate the gift card order is associated with an open proxy IP address. A fraudster can hide his/her true location by forging the IP address of his/her computing device by using an anonymous open proxy IP address. This open proxy IP address can be associated with an innocent third party's computing device and can result from infection with malware designed for this purpose. In order to determine whether the IP address associated with computing device 105B is an open proxy IP address, fraud detector 130 can check the device's IP address against publicly available lists of open proxy IP addresses maintained on the Internet. If fraud detector 130 determines that an open proxy IP address is being used, then the fraud detector can assign a high score component for this model to indicate that the transaction is likely fraudulent.

Fraud detector 130 can also consider the length and content of a personal message when determining a particular transaction's overall risk score. Generally, long and carefully worded personal messages provided during operation 210 can be representative of a legitimate gift card order. Likewise, blank messages or short messages with grammar, spelling, and/or capitalization errors can be representative of fraudulent transactions. Fraud detector 130 can analyze personal messages for these errors and assign a score contribution for this model based on the number of errors that are found.

Another fraud detection model can consider various statistics associated with a merchant. One such statistic can include the average redemption value for a gift card order based on the merchant's line of business. For example, if movie theaters generally process gift card orders having a redemption value of $20, and buyer 105A places an order for a $100 gift card for a particular movie theater, then fraud detector 130 can determine that the transaction is fraudulent and assign a high score contribution. Of course, the average redemption value for a gift card can depend on the merchant's line of business. While a purchase order for a $100 movie theater gift card may arouse suspicion, a purchase order for a $100 gift card for an electronics store may not. In this latter scenario, fraud detector 130 can determine that the transaction may be legitimate and assign a low score contribution. In some implementations, fraud detector 130 can adjust a fraud score based solely on the merchant's line of business. Certain industries (e.g., gasoline companies) see a much higher incidence of gift card fraud than others (e.g., bookstores). Fraud detector 130 can increase the score contribution if buyer 105A purchases a gift card from a merchant in a high risk industry. Similarly, fraud detector 130 can decrease the score contribution if merchant selling the gift card is in a low risk industry.

Another statistic for consideration is the time of day during which a purchase order is placed. A merchant may know from its sales records that most gift cards are purchased in the morning between 9 A.M. and 11 A.M. If, for example, buyer 105A purchases a large number of gift cards during late evening hours, then fraud detector 130 can determine that the transaction is fraudulent and assign a high score contribution for this model.

Fraud detector 130 can also consider buying habits commonly associated with a merchant's line of business when generating a score. For example, in the floral industry, people generally purchase flowers for another person. If, however, buyer 105A places a large gift card order at a florist for himself/herself, then fraud detector 130 can determine that the transaction is fraudulent and assign a high score contribution for this model.

Fraud detector 130 can use any combination of the fraud detection models described above in any sequence to generate an overall risk score in accordance with Equation 1 during operation 220C. The overall risk score can be updated as additional data values become available. For example, operation 220C may generate a preliminary overall risk score based on data values associated with operation 205. This preliminary overall risk score can be updated with additional data values from operations 203, 210, and 215. In order to account for these additional data values, server 120 can determine at operation 222 whether data values have been provided from each of operations 203, 205, 210, and 215. If not, processing can return to the unperformed operations at 224 to collect additional data values. However, if data values have been provided from each of operations 203, 205, 210, and 215, then processing can proceed to operation 225.

Figure 3:
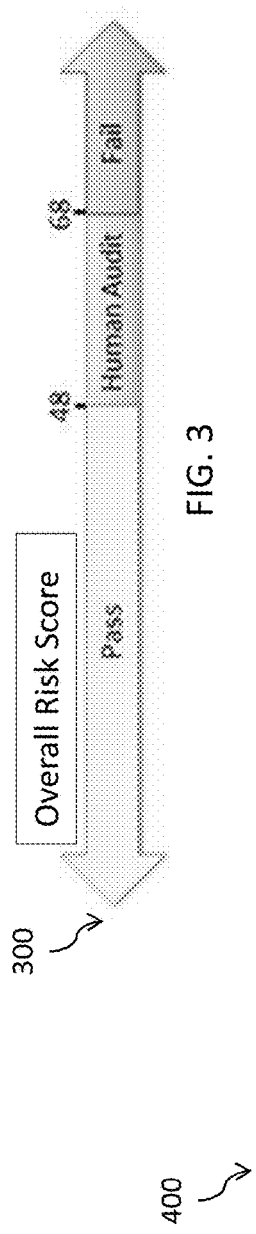
FIG. 3 illustrates a graphical representation of an overall risk score.

At operation 225, fraud detector 130 can compare the overall risk score with the various threshold scores illustrated in FIG. 3. The threshold scores of FIG. 3 are merely exemplary and can be adjusted by an administrator.

Referring to these exemplary threshold scores, if fraud detector 130 determines that the overall risk score is greater than 68, then the gift card order can be considered fraudulent (i.e., a failing score). Upon making this determination, fraud detector 130 can deny the purchase order at operation 230 and notify buyer 105A of the same. The data values associated with the purchase order can be added to the blacklist at operation 235.

If fraud detector 130 determines that the overall risk score is less than 48, then the gift card order can be considered legitimate (i.e., a passing score). Upon making this determination, processing can proceed directly to operation 250.

Figure 4:
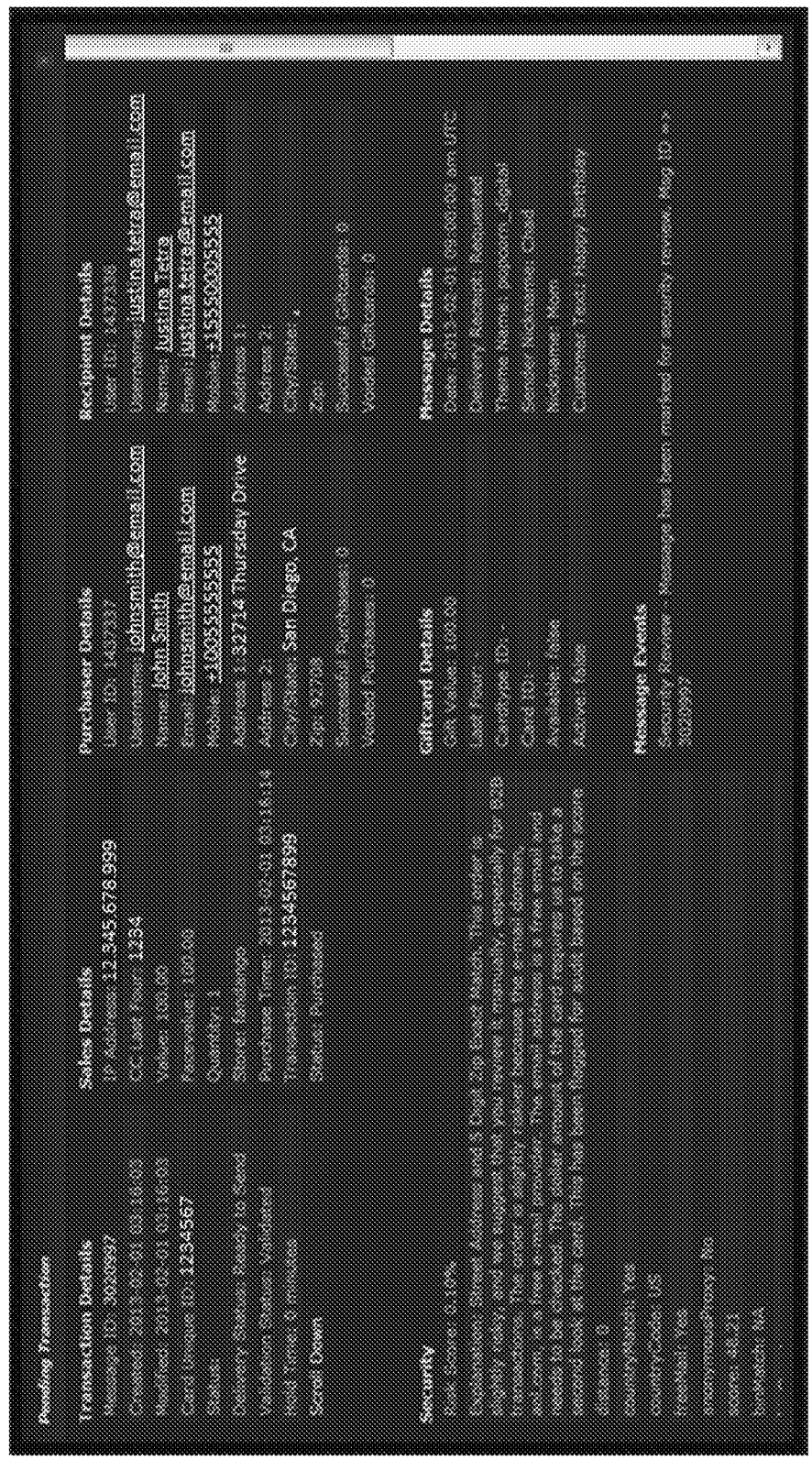
FIG. 4 illustrates a human audit interface.

If, however, fraud detector 130 determines that the overall risk score is between 48 and 68, then the fraud detector can determine that manual review of the gift card order is needed, and processing can proceed to operation 245. In order to facilitate the review of the gift card order, fraud detector 130 can provide human audit interface 400 of FIG. 4 to the reviewer.

Human audit interface 400 can provide details regarding the gift card order (in the "Transaction Details"), the redemption value of the gift card (in the "Giftcard Details"), buyer 105A (in the "Purchaser Details"), recipient 140A (in the "Recipient Details"), a personalized message or greeting associated with the gift card order (in the "Message Details"), the IP address of computing device 105B (in the "Sales Details"), and an explanation of the security risk (in the "Security" summary). If the reviewer determines that the gift card order is fraudulent after reviewing the information in interface 400, then processing can proceed to operation 230 to deny the gift card order and buyer 105A can be notified of the same. The data values associated with the gift card order can be added to the blacklist at operation 235. If, however, the reviewer determines that the gift card order is legitimate, then processing can proceed to operation 250. At operation 250, payment processor 125 can capture payment for the gift card order and inform gift card processor 135 of the same. Upon receiving confirmation of payment, gift card processor 135 can activate the gift card at operation 255.

Figure 5:
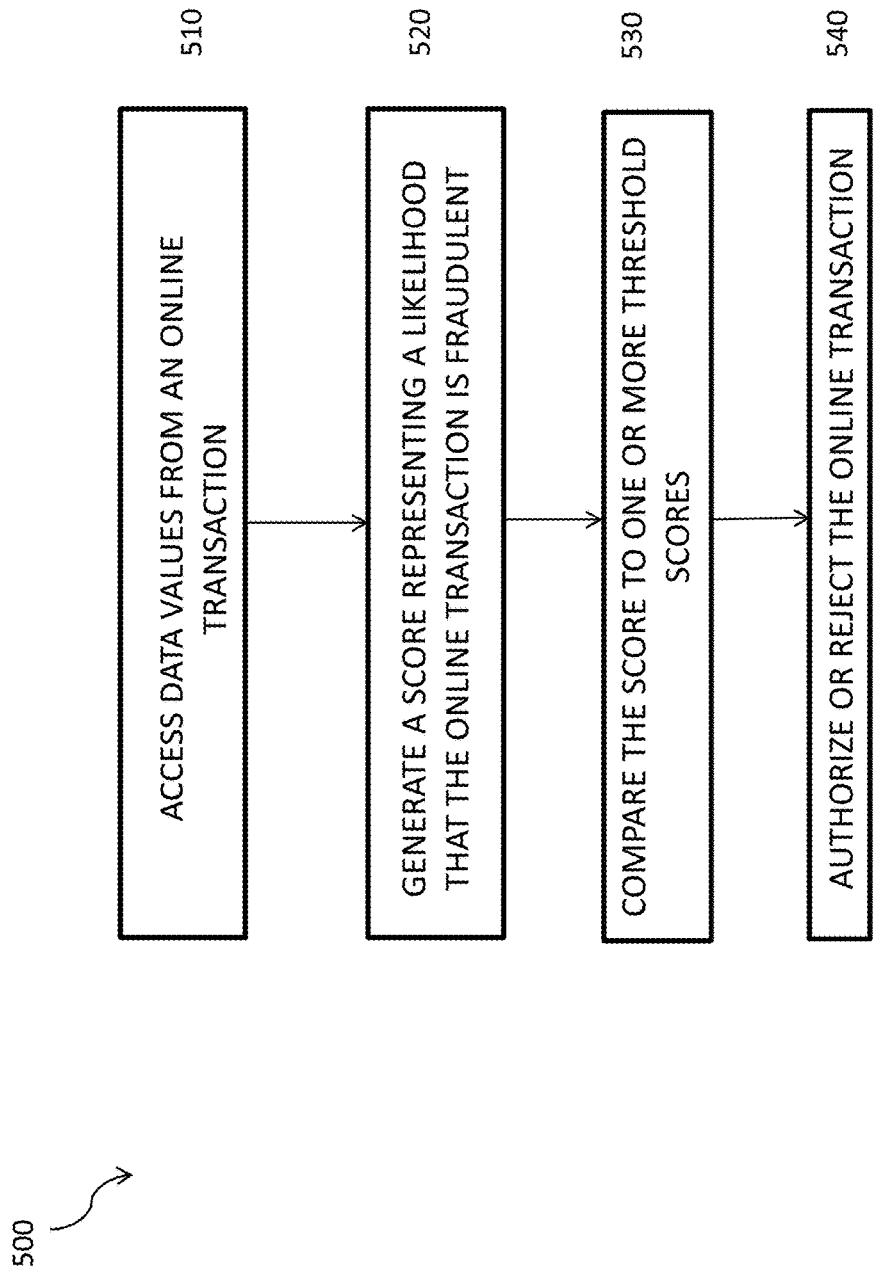
FIG. 5 illustrates a process for determining the likelihood that a gift card order is fraudulent.

FIG. 5 illustrates a process 500 for determining the likelihood that an online transaction is fraudulent.

At operation 510, fraud detector 130 can access data values from an online transaction. The online transaction can be a purchase order for one or more gift cards between a first party and a second party. The first party can be buyer 105A. The second party can be recipient 140A. The first party can initiate the online transaction. The data values associated with the online transaction can characterize various attributes associated with the first party, the second party, and a mechanism for paying for the online transaction.

At operation 520, fraud detector 130 can generate a risk score. The risk score can represent a likelihood that the online transaction is fraudulent. This risk score can be based on various fraud detection models associated with the data values and can be calculated in accordance with Equation 1.

At operation 530, fraud detector 130 can compare the score generated at operation 520 to one or more threshold scores. As illustrated in FIG. 3, these threshold scores can identify the boundaries for a passing score, a failing score, and scores requiring manual review.

At operation 540, fraud detector 130 can authorize or reject the online transaction. The former can occur if the score generated at operation 530 is a passing score or if the gift card order has successfully passed manual review. The latter can occur if the score generated at operation 530 is a failing score.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

What is claimed is:

1. A method comprising:
    accessing, by at least one processor, one or more data values associated with an online transaction associated with a first party and a second party, the online transaction initiated by the first party as a buyer for the purchase of a good or service on behalf of the second party as a recipient of the purchased good or service, the one or more data values characterizing an identity of the first party and an identity of the second party, the one or more data values represented in a message that is between the first party and the second party and that is associated with and provided as part of the online transaction;
    identifying, by the at least one processor, a relationship between the first party and the second party based on the one or more data values;
    generating, by the at least one processor, a score representing a likelihood that the online transaction is fraudulent, the generating being based on one or more models for detecting fraud using the one or more data values and including:
        searching, by the at least one processor, one or more separate sources for one or more records associated with the first party and the second party, the one or more records maintaining personal information regarding the first party and the second party, wherein the one or more sources comprise one or more social media platforms and databases, and wherein the searching the one or more separate sources comprises determining the relationship between the first party and the second party from the one or more separate sources;
        comparing, by the at least one processor, the one or more data values with the personal information in the one or more records, wherein the comparing comprises verifying that the relationship determined from the one or more separate sources matches the relationship identified between the first party and the second party from the one or more data values; and
        determining, by the at least one processor, the score using the one or more models for detecting fraud and one or more weights applied to the one or more models, wherein the one or more weights represent the respective models' score contributions, and wherein the one or more weights are determined at least in part based on the comparing of the one or more data values characterizing the message with the personal information in the one or more records and the verification;
    comparing, by the at least one processor, the score to one or more threshold scores; and
    authorizing or rejecting, by the at least one processor, the online transaction based on the comparing of the score to the one or more threshold scores.

2. The method of claim 1, further comprising: comparing, by at least one processor, the one or more data values to a blacklist of one or more negative data values when the one or more data values become available, wherein the generating follows the comparing only if none of the one or more data values matches the one or more negative data values.

3. The method of claim 1, wherein the one or more data values characterizing the identity of the first party comprise an e-mail address of the first party, and wherein the one or more models for detecting fraud determine whether a domain name of the e-mail address of the first party is associated with a free e-mail service.

4. The method of claim 1, wherein the one or more data values further characterize a payment mechanism for the online transaction including one or more of a credit card number, a debit card number, a card verification value, and a bank identification number, wherein the one or more models for detecting fraud determine a velocity of activity associated with the payment mechanism, and wherein the generating is performed before the one or more data values characterizing the payment mechanism are accessed.

5. The method of claim 1, wherein the one or more data values characterizing the identity of the first party include an IP address associated with the first party, and wherein the one or more models for detecting fraud at least: determine whether the IP address associated with the first party is a forged IP address, and determine whether a plurality of transactions are being sent from the IP address of the first party using different payment mechanisms.

6. The method of claim 1, wherein the one or more models for detecting fraud determine an amount of time that is spent by the first party while initiating the online transaction, and wherein the online transaction is an order for one or more electronic or physical gift cards.

7. The method of claim 1, further comprising: providing, by at least one processor, an audit interface for manual review of the online transaction when the score falls within a predetermined range.

8. The method of claim 1, wherein the comparing of the one or more data values with the personal information further comprises determining a number of personal attributes associated with the first party or the second party in the one or more data values that are confirmed based on the personal information, and wherein the score is further based upon the number of personal attributes that are confirmed.

9. One or more non-transitory computer-readable media containing instructions to configure one or more processors to perform operations comprising:
    accessing one or more data values associated with an online transaction associated with a first party and a second party, the online transaction initiated by the first party as a buyer for the purchase of a good or service on behalf of the second party as a recipient of the purchased good or service, the one or more data values characterizing an identity of the first party and an identity of the second party, the one or more data values represented in a message that is between the first party and the second party and that is associated with and provided as part of the online transaction;
    identifying a relationship between the first party and the second party based on the one or more data values;
    generating a score representing a likelihood that the online transaction is fraudulent, the generating being based on one or more models for detecting fraud using the one or more data values and including:
        searching one or separate more sources for one or more records associated with the first party and the second party, the one or more records maintaining personal information regarding the first party and the second party, wherein the one or more separate sources comprise one or more social media platforms and databases, and wherein the searching the one or more separate sources comprises determining a relationship between the first party and the second party from the one or more separate sources;
        comparing the one or more data values with the personal information in the one or more records, wherein the comparing comprises verifying that the relationship determined from the one or more separate sources matches the relationship identified between the first party and the second party from the one or more data values; and
        determining the score using the one or more models for detecting fraud and one or more weights applied to the one or more models, wherein the one or more weights represent the respective models' score contributions, and wherein the one or more weights are determined at least in part based on the comparing of the one or more data values characterizing the message with the personal information in the one or more records, and the verification;
    comparing the score to one or more threshold scores; and
    authorizing or rejecting the online transaction based on the comparing of the score to the one or more threshold scores.

10. The non-transitory computer-readable medium of claim 9, wherein the one or more data values characterizing the identity of the first party include an IP address associated with the first party, and wherein the one or more models for detecting fraud at least: determine whether the IP address associated with the first party is a forged IP address, and determine whether a plurality of transactions are being sent from the IP address of the first party using different payment mechanisms.

11. The non-transitory computer-readable medium of claim 9, wherein the one or more data values characterizing the identity of the first party comprise an e-mail address of the first party, and wherein the one or more models for detecting fraud determine whether a domain name of the e-mail address of the first party is associated with a free e-mail service.

12. The non-transitory computer-readable medium of claim 9, wherein the one or more models for detecting fraud determine an amount of time that is spent by the first party while initiating the online transaction, and wherein the online transaction is an order for one or more electronic or physical gift cards.

13. The non-transitory computer-readable medium of claim 9, wherein the comparing of the one or more data values with the personal information further comprises determining a number of personal attributes associated with the first party or the second party in the one or more data values that are confirmed based on the personal information, and wherein the score is further based upon the number of personal attributes that are confirmed.

14. The non-transitory computer-readable medium of claim 9, the operations further comprising: comparing the one or more data values to a blacklist of one or more negative data values when the one or more data values become available, wherein the generating follows the comparing only if none of the one or more data values matches the one or more negative data values.

15. The non-transitory computer-readable medium of claim 9, wherein the one or more data values further characterize a payment mechanism for the online transaction including one or more of a credit card number, a debit card number, a card verification value, and a bank identification number, wherein the one or more models for detecting fraud determine a velocity of activity associated with the payment mechanism, and wherein the generating is performed before the data values characterizing the payment mechanism are accessed.

16. The non-transitory computer-readable medium of claim 9, the operations further comprising providing an audit interface for manual review of the online transaction when the score falls within a predetermined range.

17. A system comprising:
one or more processors; and
one or more memories, storing instructions for performing operations, wherein the one or more processors and the one or more memories are configured to perform the operations comprising:
accessing one or more data values associated with an online transaction associated with a first party and a second party, the online transaction initiated by the first party as a buyer on behalf of the purchase of a good or service for the second party as a recipient of the purchased good or service, the one or more data values characterizing an identity of the first party and an identity of the second party, the one or more data values represented in a message that is between the first party and the second party and that is associated with and provided as part of the online transaction;
identifying a relationship between the first party and the second party based on the one or more data values;
generating a score representing a likelihood that the online transaction is fraudulent, the generating being based on one or more models for detecting fraud using the one or more data values and including:
searching one or more separate sources for one or more records associated with the first party and the second party, the one or more records maintaining personal information regarding the first party and the second party, wherein the one or more separate sources comprise one or more social media platforms and databases, and wherein the searching the one or more separate sources comprises determining a relationship between the first party and the second party from the one or more separate sources;
comparing, by at least one processor, the one or more data values with the personal information in the one or more records, wherein the comparing comprises verifying that the relationship determined from the one or more separate sources matches the relationship identified between the first party and the second party from the one or more data values; and
determining, by at least one processor, the score using the one or more models for detecting fraud and one or more weights applied to the one or more models, wherein the one or more weights represent the respective models' score contributions, and wherein the one or more weights are determined at least in part based on the comparing of the one or more data values characterizing the message with the personal information in the one or more records, and the verification;
comparing the score to one or more threshold scores; and
authorizing or rejecting the online transaction based on the comparing of the score to the one or more threshold scores.

18. The system of claim 17, the operations further comprising: comparing the one or more data values to a blacklist of one or more negative data values when the one or more data values become available, wherein the generating follows the comparing only if none of the one or more data values matches the one or more negative data values.

19. The system of claim 17, wherein the one or more data values further characterize a payment mechanism for the online transaction including one or more of a credit card number, a debit card number, a card verification value, and a bank identification number, wherein the one or more models for detecting fraud determine a velocity of activity associated with the payment mechanism, and wherein the generating is performed before the data values characterizing the payment mechanism are accessed.

20. The system of claim 17, wherein the comparing of the one or more data values with the personal information further comprises determining a number of personal attributes associated with the first party or the second party in the one or more data values that are confirmed based on the personal information, and wherein the score is further based upon the number of personal attributes that are confirmed.

21. The system of claim 17, wherein the one or more data values characterizing the identity of the first party include an IP address associated with the first party, and wherein the one or more models for detecting fraud at least: determine whether the IP address associated with the first party is a forged IP address, and determine whether a plurality of transactions are being sent from the IP address of the first party using different payment mechanisms.

* * * * *